United States Patent [19]

Goose

[11] 4,026,084
[45] May 31, 1977

[54] CONNECTION MEMBERS FOR CONSTRUCTIONAL SYSTEM

[75] Inventor: Alan Charles Goose, Sheffield, England

[73] Assignee: Aluminum Systems Limited, Sheffield, England

[22] Filed: Oct. 22, 1975

[21] Appl. No.: 624,890

[30] Foreign Application Priority Data

Oct. 22, 1974 United Kingdom ............ 45707/74

[52] U.S. Cl. .................................. 52/495; 52/656; 403/255

[51] Int. Cl.² ........................................... F16B 3/00

[58] Field of Search .......... 403/252, 255, 254, 187, 403/201; 52/495, 656, 461, 758 R, 758 C, 758 F, 758 H, 760

[56] References Cited

UNITED STATES PATENTS 3,451,183  6/1969  Lespagnol et al. .................. 52/656

3,592,493  7/1971  Goose ................................. 52/656

FOREIGN PATENTS OR APPLICATIONS 1,256,226  12/1971  United Kingdom ................ 52/656
1,314,878  4/1973  United Kingdom ............... 403/187

Primary Examiner—Andrew V. Kundrat
Attorney, Agent, or Firm—Hill, Gross, Simpson, Van Santen, Steadman, Chiara & Simpson

[57] ABSTRACT

Connection members for constructional systems based on two extruded sections, one having an undercut channel formation along one face, and the second section have two such channels along one face, are characterized by having a base member which fits into the single channel formation of the first section and a spaced pair of parallel side members which fit in the two channel formations of the second section to be connected to the first, securement of the correction member to the two sections joining the sections together.

12 Claims, 5 Drawing Figures

CONNECTION MEMBERS FOR CONSTRUCTIONAL SYSTEM

This invention relates to connection members for making joints between separate lengths of extruded or other sections, and is a modification of the invention of out U.K. Patent No. 1,256,226, hereinafter referred to as "the parent patent".

The parent patent provides a connection member for making joints between separate lengths of extruded or other sections, a first such length having an outwardly facing open-ended undercut channel formation along one face thereof and the second such length having such a channel in each of two opposite faces thereof the member comprising a base which is arranged to be passable into an end of said channel formation along one face of the first said section and being of such form as to be prevented thereby from passing through the channel mouth whilst movable to any desired position therealong, securing means accessible for actuation through the mouth of the channel in said first section whereby the connection member may be secured to said first section at said desired position therealong, and carried by the base so as to project through the mouth of the channel in the first section, a spaced pair of said members each extending along a respective one of a pair of parallel axes and arranged to be passable in its axial direction into the end of a respective one of the pair of channel formations along opposite faces of the second said section, each side member having a tapped hole therethrough inclined to the axis thereof and each such hole having a threaded member screwed therein and accessible for actuation via the mouth of the associated channel in the second section whereby tightening of the threaded members serves to draw or urge the second section into a rigid fixed relationship with the first section.

The connection member of the parent patent provides a strong connection between the two lengths, by virtue of the urging or drawing together of the two sections provided by actuation of the two threaded members. The provision of two, spaced-apart side members or limbs also serves to strengthen the connection, making it highly resistant to forces tending to axially rotate the second length with respect to the first or tending to relatively pivot the lengths about the point of connection. A particularly important advantage of the connection member of the parent patent is the simplicity with which a connection can be made by employing the member. Both the securing means and the threaded members are actuable through the mouths of the associated channels. Connection is effected simply by slidingly the member into place along the channel in the first member; fixing it in place with the securing means, e.g. a screw; sliding the second length on to the side members; and tightening the threaded members. A connection can thus be made in a very short time using only a simple hand tool such as an Allan key or screwdriver; and can therefore be made by unskilled labour. In contrast to known connection members, there is no need to provide the lengths adjacent the joint with special configurations or supplementary connection members, or to drill holes in or otherwise operate on the lengths adjacent the joint, for a connection to be made.

The present invention provides a modified connection member in which all of the above-outlined advantages are obtained. The connection member of the present invention is modified in that the side members are arranged for co-operation with a modified second length in which the two channels are along the same face thereof. The connection member is installed in the same way as that of the parent patent, save that the threaded members are both actuated from the same, said face of the second length. Preferably, the free end of each of the side members is provided with an angled surface such that the tapped hole through the member is substantially perpendicular to the angled surface and passes therethrough.

According to another aspect of the invention there is provided a constructional system comprising at least one connection member according to the invention, at least one extruded aluminium or other rigid principal section comprising inner webs forming at least the corner portion of an inner rectangle or core, intermediate webs extending outwardly from at least the corners of the core and outer webs carried by the intermediate webs and defining at least the corner portions of an outer rectangle concentric with the inner rectangle, a longitudinal slot being provided between the webs extending from the corners of at least one side of the outer rectangle of one section whereby such principal section has an undercut formation along at least one face thereof, and at least one extruded aluminium or other rigid secondary section having webs forming a main rectangle, and having extending from an outer face of one such web additional webs forming two further rectangles, a longitudinal slot being provided between the webs extending from the corners of the side of each further rectangle facing outwardly of the main rectangle, whereby such secondary section has two undercut formations along one face thereof with said slots forming the mouths thereof. Preferably, at least one longitudinal slot is provided in each of at least two sides of the outer rectangle of a principal section, whereby such section has at least one undercut channel formation along each of at least two faces thereof. The outer rectangle of the cross-section of the or each principal section may have sides which are equal to or are integral multiples of a unit distance.

In a preferred embodiment of the invention, an inner web of the or each principal section extends to form a complete side of the inner rectangle adjacent the or each longitudinal slot in the section. It is also desirable to use a cover for the face of the secondary section having the two longitudinal slots therein, which cover includes two webs which are aligned, in use, with the faces of the secondary section adjacent the slotted face.

The nature of the present invention will be more readily understood by referring to the following description of an exemplary form thereof and to the accompanying drawing, in which.

In many respects, the illustrated connection member and first section are similar to those disclosed in the parent patent. The following description is to some extent restricted to the features of difference and reference is directed to the parent patent for a fuller disclosure of the details of construction.

Figure 5:
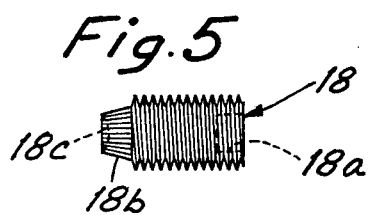
FIG. 5 is an elevational view of a pointed end grub screw used for securing the connection members in place.

The connection member 10 is formed integrally from a zinc alloy, fibre glass reinforced nylon, or, preferably, aluminium and comprises a base 12 and two side members or limbs 14, 16 extending in mutually parallel fashion from the base. A screw 18 is threaded into a tapped hole extending through the base 12. Screws 20, 22 are threaded into tapped holes respectively extending through the limbs 14, 16 the screws being inclined to the axes of the limbs. Each of the screws 18, 20, 22 may be of the form of a pointed end grub screw shown in FIG. 5 where the screw 18 has a hexagonal socket 18a at one end, a frusto-conical knurled section 18b at the other end with a recess forming a cup 18c. In use the knurled section 18b bites into the surface against which the screw 18 is being tightened assisted by the cutting action of the edge of the cup 18c. The grub screw is also illustrated in FIG. 11 of the parent patent.

Figure 1:
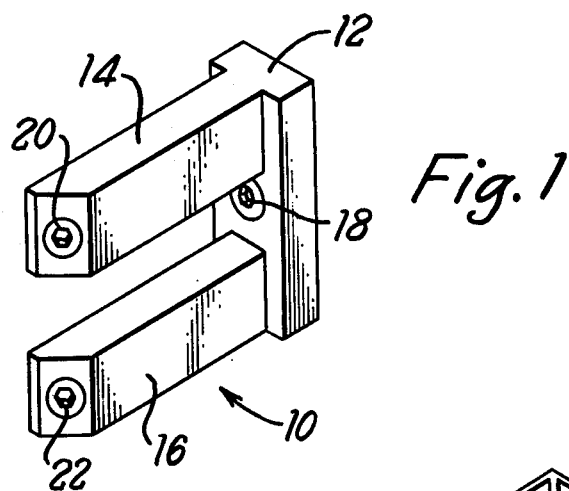
FIG. 1 is a perspective view of a connection member in accordance with the present invention.
Figure 2:
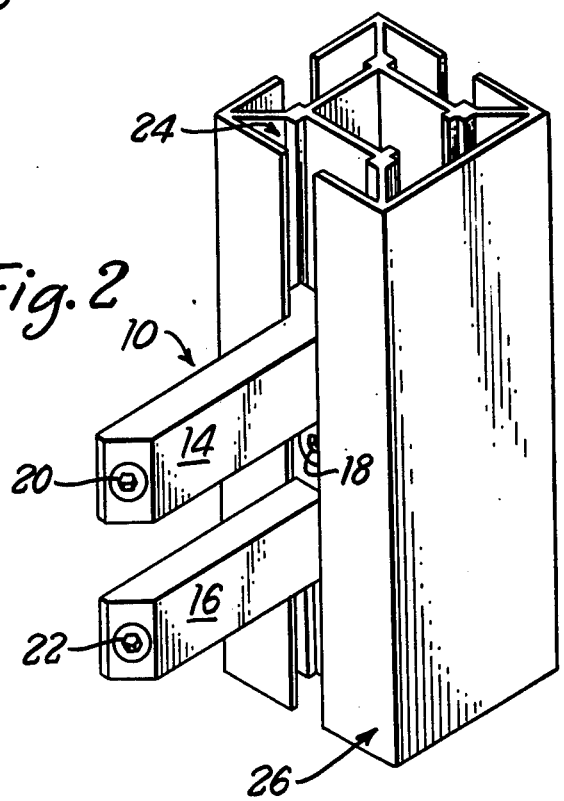
FIG. 2 is a perspective view of the connection member of FIG. 1 secured at a desired position along a channel in one face of a first extruded, profiled, aluminium section.

Referrring now to FIG. 2, the connection member 10 is shown secured in place at a desired position along a channel 24 in a face of a first length of extruded section 26. The section 26 is of similar construction to those illustrated and described in the parent patent. In exactly the same manner described in the parent patent, the base 12 is slid into either end of the channel 24, slid therealong to the desired position, and secured in place by the tightening the screw 18. Tightening of the screw 18 causes the end of the screw to contact the base of the channel 24 and forces the base 12 against the undercut mouth of the channel.

Figure 3:
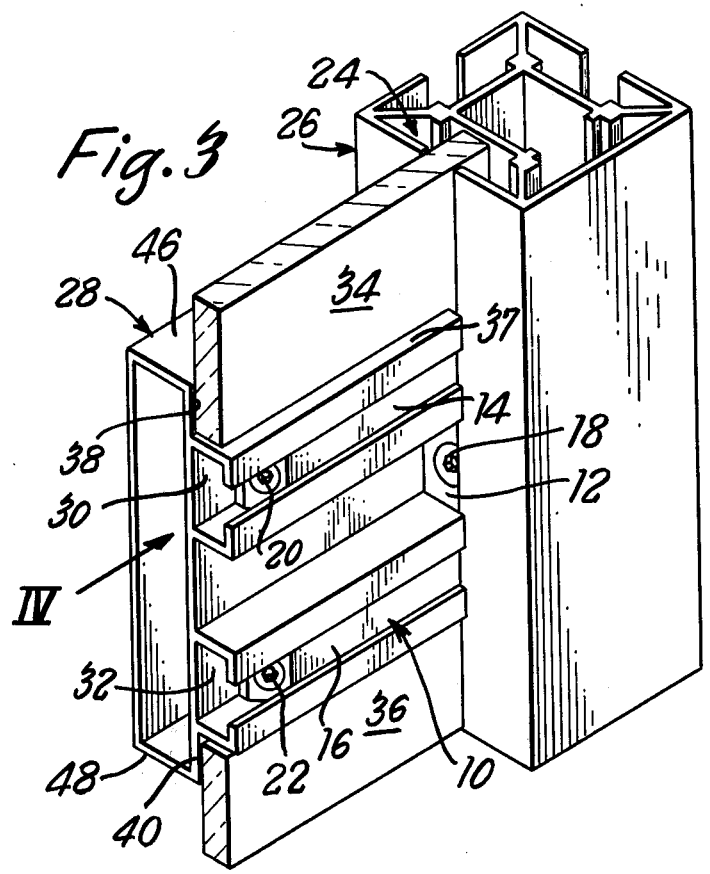
FIG. 3 is a perspective view of the structure of FIG. 2 after a second length of extruded, profiled, aluminium section having a pair of mutually parallel channels on one face thereof has been secured to the first length by the connection member; and, FIG. 4 is a scrap view taken in the direction of the arrow IV in FIG. 3.

Referring now to FIG. 3, the connection member 10 connects the first length 26 to a second length 28 in a manner exactly analogous to the way in which the connection member of the parent patent connects together two lengths. However, in the present case, the second length 28 has two channels 30, 32 in one face thereof. The second length 28 is extruded as a box section with the channels 30, 32 on one face and the limbs 14, 16 extend into the channels and are secured in place therein by tightening of the screws 20, 22 through the mouths of the channels.

As can be seen from FIG. 3, a structure formed by employing one or more of the connection members 10 can be used to mount a pair of panels 34, 36. The panels 34, 36 are mounted within the channel 24 in the first length 26, above and below the second length 28. The other ends of the panels 34, 36 can be similarly mounted within a channel in another length of extrusion, similar to the first length 26, secured to the other end of the second length 28 in the same manner as the illustrated end of the second length is secured to the first length 26. The bottom edge of the panel 34 rests on the top outer surface 37 of the channel 30, and portions 38, 40 of the face of the second length 28 on which the channels 30, 32 are formed assist in supporting or locating the panels 34 and 36 respectively.

Figure 4:
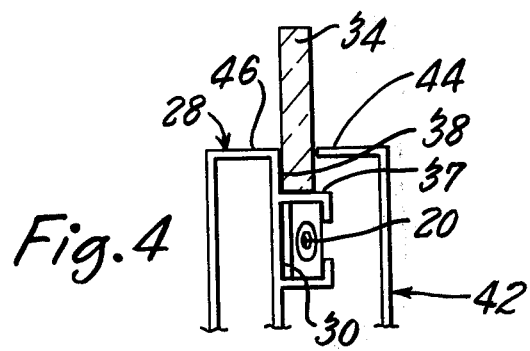

Once the connections at the two ends of the second length 28 have been made, a cover 42 (FIG. 4) may be secured to the second length 28 in any suitable manner to cover the channels 30, 32 and the limbs 14, 16. For example, polyvinylchloride clips (not shown) may be secured within the channels 30, 32 in turnbuckle fashion and the cover 42 may be secured to the clips by means of mating tooth or claw formations (not shown) on the cover and on the clips. The cover 42 includes a web 44 which is aligned, in use, with the upper face 46 of the second length 28. The cover 42 includes a further web (not shown) along its lower edge for alignment with the lower face 48 of the second length 28.

The invention can be carried into effect in different ways than that illustrated. For instance, the limbs 14, 16 need not extend perpendicularly from the plane of the face of the first length 26 containing the channel. They may be inclined to such plane so as to permit connection to be effected between the lengths at an angle which is not, as illustrated, a right angle. For example, if the limbs are inclined upwardly as the structure is viewed in FIG. 2, and provided the end of the second length 28 is cut at a corrresponding angle, a connection may be made such that the second length 28 extends upwardly from the joint.

I claim:

1. A constructional system for making joints between separate lengths which may be extruded which comprises a first length having an outwardly facing, open ended, undercut channel formation with a mouth along one face thereof, a second length having two such channels with mouths along one face thereof, a connection member having a base which is passable into an end of the channel formation along said one face of said first length and is of such form as to be prevented thereby from passing said channel mouth while movable to any desired position along the channel, securing means accessible for actuation through said mouth of said channel in said first length whereby the connection member may be secured by its base to said first length at said desired position therealong to project through said mouth of said channel in said first length, said connection member having a spaced pair of side members each extending along a respective one of a pair of parallel axes and passable in its axial direction into the end of a perspective one of the two channel formations along the said one face of said second length, each of said side members having a tapped hole therethrough inclined to the axis thereof in the direction of the base thereof, and a threaded member screwed into each such hole and accessible for actuation through said mouth of the associated channel in said second length whereby tightening of the threaded members draws the second length into rigid fixed relationship with said first length.

2. The constructional system of claim 1 wherein the free end of each of the side members has an angled surface and the tapped hole passes through the angled surface in perpendicular relation therewith.

3. The constructional system of claim 1 in which each threaded member is a pointed end screw.

4. The constructional system of claim 3 wherein the screw has a circular cutting edge on its pointed end and a hexagonal socket in its opposite end.

5. The constructional system of claim 1 wherein the channels of the second length have panel supporting ledges along the lengths thereof.

6. The constructional system of claim 4 including panels abutting said ledges and extending into the channel of the first length.

7. The constructional system of claim 1 in which said first length is an extruded rigid member having inner webs forming at least the corner portion of an inner rectangular shaped core, intermediate webs extending outwardly from at least the corners of the inner webs, and outer webs carried by the intermediate webs and defining at least the corner portions of an outer rectangular cross sectional shaped core said first length having a longitudinal slot between the webs defining adjacent corners of one side of the outer rectangular shape of the length to form said outwardly facing open ended undercut channel, and in which said second length is an extruded rigid section having webs forming a main rectangular core and having extending from an outer face of one such web additional webs each adjacent pair of which forms one of said outwardly facing open ended undercut channel formations.

8. The constructional system of claim 7 in which at least one longitudinal slot is provided in each of at least two sides of the outer rectangular shape of the section whereby such section has at least one undercut channel formation along each of at least two faces thereof.

9. The constructional system of claim 7 in which the outer rectangular shape of the cross section of the section has sides which are equal to or are integral multiples of a unit distance.

10. The constructional system of claim 7 in which inner webs form a complete side of an inner core adjacent the longitudinal slot.

11. The constructional system of claim 7 including a cover for the face of the secondary length having the two longitudinal slots therein and said cover having webs aligned with faces of the second length adjacent the slotted face.

12. The constructional system of claim 7 in which the first length has an intermediate web extending normally outwardly from an inner web to provide a side surface normal to the base of at least one channel.

* * * * *